(12) United States Patent
Werfeli

(10) Patent No.: US 8,568,123 B2
(45) Date of Patent: Oct. 29, 2013

(54) UNIVERSAL AUXILIARY CONTROLLER FOR AN INJECTION MOULDING MACHINE

(75) Inventor: Friedrich Werfeli, Schwändi (CH)

(73) Assignee: Nestal-Maschinen AG, Näfels (DE)

( * ) Notice: Subject to any disclaimer, the term of this patent is extended or adjusted under 35 U.S.C. 154(b) by 0 days.

(21) Appl. No.: 13/823,576

(22) PCT Filed: Sep. 20, 2011

(86) PCT No.: PCT/EP2011/066324
§ 371 (c)(1),
(2), (4) Date: Mar. 14, 2013

(87) PCT Pub. No.: WO2012/038429
PCT Pub. Date: Mar. 29, 2012

(65) Prior Publication Data
US 2013/0177665 A1    Jul. 11, 2013

(30) Foreign Application Priority Data
Sep. 22, 2010 (DE) .......................... 10 2010 046 275

(51) Int. Cl.
*B29C 45/80* (2006.01)

(52) U.S. Cl.
USPC ............................ 425/145; 425/149; 425/150

(58) Field of Classification Search
USPC ........................................ 425/145, 149, 150
See application file for complete search history.

(56) References Cited

U.S. PATENT DOCUMENTS

| | | | | |
|---|---|---|---|---|
| 3,666,141 A | * | 5/1972 | Ma et al. | 425/145 |
| 3,693,946 A | * | 9/1972 | Merritt | 425/145 |
| 5,056,999 A | * | 10/1991 | Lewis et al. | 425/150 |
| 6,109,904 A | | 8/2000 | Hehl | |
| 6,477,835 B1 | | 11/2002 | Geiger | |
| 6,517,337 B1 | | 2/2003 | Hehl | |
| 7,846,054 B2 | | 12/2010 | Schmidt et al. | |
| 2005/0258795 A1 | | 11/2005 | Choi | |
| 2009/0065962 A1 | | 3/2009 | Budde et al. | |
| 2009/0291162 A1 | | 11/2009 | Wenzin et al. | |
| 2010/0071187 A1 | | 3/2010 | Weinmann et al. | |

FOREIGN PATENT DOCUMENTS

| | | |
|---|---|---|
| DE | 196 22 396 | 12/1997 |
| DE | 198 47 298 | 4/2000 |
| DE | 102 39 591 | 3/2003 |
| DE | 102004054601 | 6/2005 |
| EP | 0 275 992 | 7/1988 |
| EP | 1 920 300 | 7/2010 |
| WO | WO 2008/068238 | 6/2008 |

OTHER PUBLICATIONS

International Search Report issued by the European Patent Office in International Application PCT/EP2011/066324 on Dec. 15, 2011.

* cited by examiner

*Primary Examiner* — Tim Heitbrink
(74) *Attorney, Agent, or Firm* — Henry M. Feiereisen LLC

(57) ABSTRACT

The invention relates to a universal auxiliary controller for an injection molding machine, comprising an operating panel, a machine controller coupled to the operating panel, a converter acted on by the machine controller, a controllable electric motor that can be actuated by the converter, and a resolver. According to the invention, the controllable electric motor is coupled to a standardized shaft interface, which can selectively be connected to a complementary shaft interface of a mechanical operating element or a hydraulic operating element.

14 Claims, 3 Drawing Sheets

UNIVERSAL AUXILIARY CONTROLLER FOR AN INJECTION MOULDING MACHINE

CROSS-REFERENCES TO RELATED APPLICATIONS

This application is the U.S. National Stage of International Application No. PCT/EP2011/066324, filed Sep. 20, 2011, which designated the United States and has been published as International Publication No. WO 2012/038429 and which claims the priority of German Patent Application, Serial No. 10 2010 046 275.6, filed Sep. 22, 2010, pursuant to 35 U.S.C. 119(a)-(d).

BACKGROUND OF THE INVENTION

The present invention relates to a universal auxiliary controller for an injection moulding machine according to the introductory clause of claim 1.

In particular in otherwise electrically operated injection moulding machines it is known to provide auxiliary controllers for ancillary units—in particular in the moulding tool. For example, it is necessary to be able to operate core pullers or ejectors independently. A problem here is that hydraulic auxiliary controllers generally waste a great deal of energy. Electrically operated auxiliary controllers, on the other hand, are not becoming properly accepted, because there are a large number of existing tools with hydraulically operable components, which can no longer be operated by electrically operated auxiliary controllers. The poor efficiency of the auxiliary controller is often also due to the fact that a valve with high throttling losses is used and a hydraulic unit for an auxiliary controller must be designed in order to be able to operate all possible auxiliary controllers.

SUMMARY OF THE INVENTION

It is known, moreover, that manufacturers of moulding tools offer tools with electric drives and their own controller. This own controller requires a separate operation, however, which is costly. Moreover, toolmakers generally do not have the necessary knowhow for control technology, so that this work has to be contracted out separately at a high price.

It is an object of the present invention to indicate a universal auxiliary controller for injection moulding machines, which can operate both electric and hydraulic operating elements and works in an energy-efficient manner. The characteristics which are usual today are to be maintained, so that the speed and the force limitation of the core puller can be adjusted; in addition, the possibility of realizing a travel security is to be offered.

This object is solved by a universal auxiliary controller for an injection moulding machine, including an operating unit, a machine controller which is coupled with the operating unit, a converter acted upon by the machine controller, a controllable electric motor acted upon by the converter, and a resolver, wherein the controllable electric motor is connected with a standardized shaft interface which can be selectively connected to a complementary standardized shaft interface of a mechanical or of a hydraulic operating element.

Accordingly, an idea of the present invention is to be seen in configuring a universal auxiliary controller with an operating unit, a machine controller, a converter, an electric motor and a resolver (rotation angle pickup) so that the controllable electric motor is connected with a standardized shaft interface, which is selectively able to be connected to a complementary shaft interface of a mechanical or a hydraulic operating element.

A rotation speed and a torque are transferred with the shaft. The rotation speed and the maximum torque are specified by the controller and the converter. The transferred actual torque and the actual rotation speed are evaluated by the converter and the controller.

Through the idea of the standardized interface of the drive shaft (shaft interface), the auxiliary controller can now be coupled both to electric operating units which can comprise for example mechanical operating elements such as a gear, spindle-nut combinations, pinion-toothed belt combination or pinion-rack combinations, or to hydraulic operating elements, which comprise for example hydraulic pumps or hydraulic servo valves. For this purpose, the motor flange-drive shaft interface is defined as standard (standardized shaft interface) and is hence able to be used universally. Moreover, it is possible with the present invention to define a module set which can be composed according to the requirement profile of the companies.

According to a preferred embodiment of the present invention, a hydraulic operating element, which is driven with the universal auxiliary controller via the shaft interface, has, moreover, a standardized hydraulic interface, which is able to be combined with a hydraulic interface, constructed in a complementary manner, of a hydraulic drive (which is integrated for example in a forming tool). Hence a module set is provided, in which for the actuation of mechanical ancillary units the user merely requires a combination with a controllable electric motor. If the operator wishes in addition to operate hydraulic drive units contained in older moulding tools, then he can acquire the hydraulic operating element which is to be interposed accordingly as a module.

Such a hydraulic operating element according to a first alternative embodiment has a hydraulic pump which is connected with the complementary shaft interface directly or indirectly mechanically with the drive thereof and the hydraulic in- and outputs thereof are connected with the hydraulic interface. A gear can be connected here between the pump and servo motor.

According to an alternative embodiment of the hydraulic operating unit, this comprises, instead of a pump, a servo valve, the slider of which is mechanically connected with the servo motor and is able to be actuated via the latter, possibly with interposition of a corresponding gear. In such a device, the hydraulic pressure present in the system—for example of a hydraulic or hybrid injection moulding machine—can also be used for the operation of a hydraulic drive for the ancillary unit(s).

As a whole, therefore, at least one standardized shaft interface is necessary, which ensures the connection of the universal auxiliary controller with mechanical or hydraulically operated ancillary units such as core pullers. In addition, in the hydraulic operation of core pullers, a second module of a standardized hydraulic interface is possible, which fits already existing hydraulic connections of available hydraulically operable ancillary units, e.g. in moulding tools.

With this auxiliary controller therefore electrically and also hydraulically operated ancillary units can be moved, wherein the controller must merely know the characteristics of the drives in the ancillary units. In this case, the toolmaker merely has to realize the gear, the mechanical drive or the hydraulic drive in the tool.

With the unchanged arrangement on the machine side, therefore an electric and also a hydraulic ancillary unit can be operated, for which an interface-compatible arrangement must be present, which on the one hand complies with the shaft interface and on the other hand—if present—with the hydraulic interface. The module for the hydraulic operating element must offer or respectively make available a sufficient hydraulic through-flow and pressure.

According to various advantageous embodiments, arrangements can be provided, moreover, in order to carry out calibration processes for the determining of stroke, travel resistance course and/or of the transmission ratio from the servo motor angle position up to the position of the auxiliary drive in the tool, carry out initializing processes for the preparation of the coupling and/or uncoupling of the shaft interface, which processes make provision that the shaft is situated in a suitable position, carry out checking processes for checking the coupling of the shaft interface with the aim of checking whether the coupling transfers the necessary torque and whether the correct "interface" was coupled, reach a predetermined position without path measurement in the tool and detect travel resistance with the aid of the motor current during the travel movement and to compare it with deposited threshold values, threshold value courses or stored good values.

A component of the present invention is, moreover, a method for operating the above-mentioned advantageous arrangements, in particular:

the determining of stroke, travel resistance path and/or of the transmission ratio from the servo motor angle position up to the position of the auxiliary drive in the tool by means of calibration processes, the preparation of the coupling and/or uncoupling of the shaft interface initializing processes such that provision is made that the shaft is situated in a suitable position, carrying out processes for checking the coupling of the shaft interface with the aim of establishing whether the coupling transfers the necessary torque and whether the correct "interface" (with the presence of various interfaces) was coupled, reaching a predetermined position in the tool, without using a path measurement—for example through the evaluation of electrical transmitter signals—and detecting the travel resistance with the aid of the motor current during the travel movement and comparing it with deposited threshold values, threshold value courses or stored good values.

BRIEF DESCRIPTION OF THE DRAWING

The present invention is explained in further detail below with the aid of various example embodiments and with reference to the enclosed drawings. The drawings show in FIG. 1 a schematic block diagram of a first embodiment of the present invention, FIG. 2 a schematic block diagram of a second embodiment of the present invention and FIG. 3 a schematic block diagram of a third embodiment of the present invention.

DETAILED DESCRIPTION OF PREFERRED EMBODIMENTS

Figure 1:
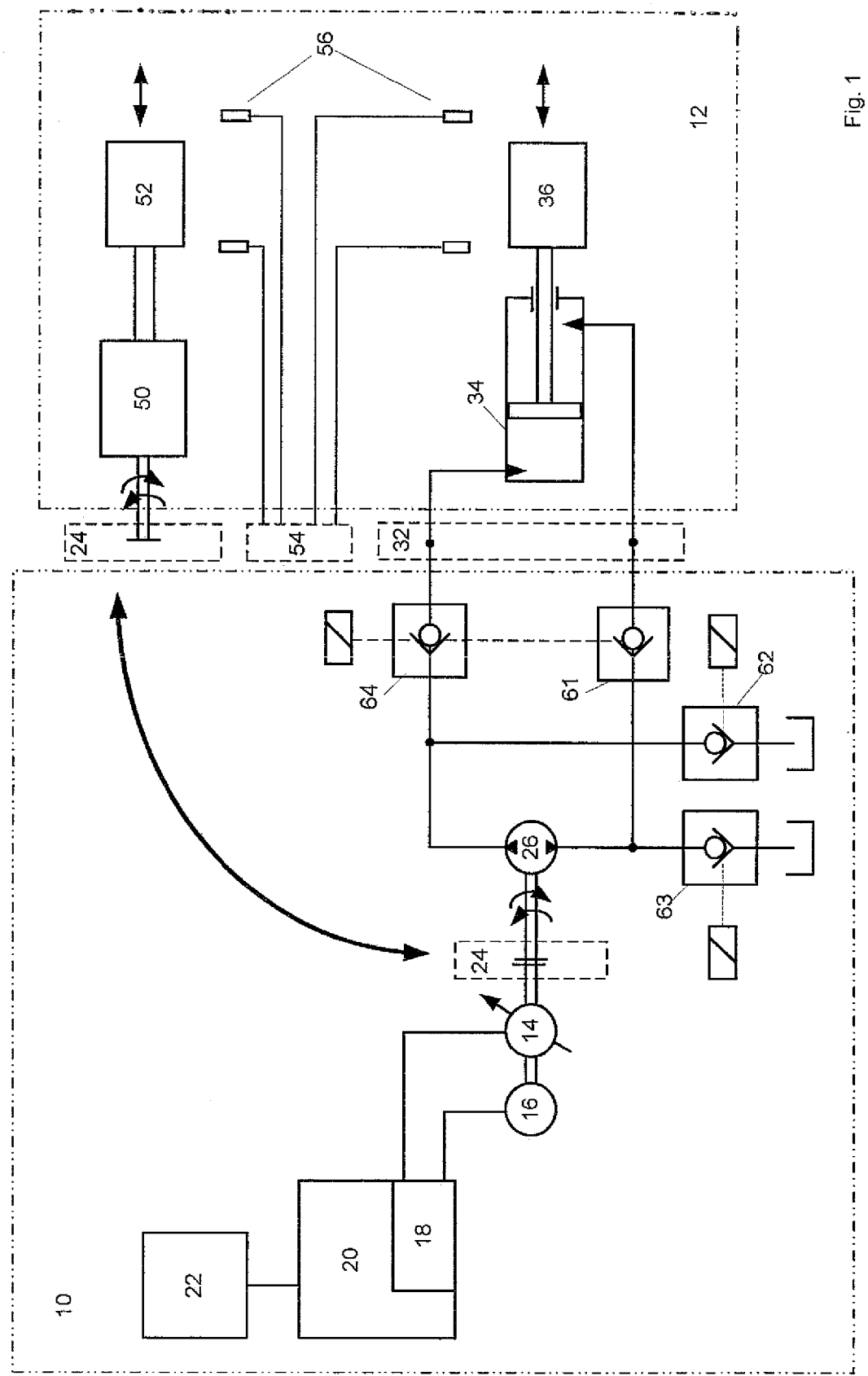

In FIG. 1 a first embodiment is presented for a universal auxiliary controller according to the invention for the operation of an electrical and also of a hydraulic core puller in a moulding tool (not shown). The components which are realized on the injection moulding machine side are presented here in the box framed by the reference number 10, and the components which are realized on the moulding tool side are presented in the box framed by the reference number 12.

According to the present invention, a controllable servo motor 14 is provided, which is acted upon by a converter 18, wherein a resolver 16 (rotation angle transmitter) is provided on the axis, which feeds back the mode of operation and position of the servo motor 14 to a controller. The converter is integrated in the controller 20 of the injection moulding machine or is connected therewith. The controller 20 of the injection moulding machine can be adjusted accordingly via an operating unit 22, with which it is connected.

An essential element of the present invention is the standardized shaft interface 24, which ensures a standardized connection between the servo motor and the subsequent drive shaft. For example, corresponding flanges are provided, which can be coupled with one another mechanically in a corresponding manner. The shaft interface which is complementary to the standardized shaft interface is—as will become clearer below—provided for example on a mechanical operating element and also on a hydraulic operating element for coupling.

The servo motor 14 is connected here mechanically via the shaft interface 24 with a hydraulic pump 26, which is connected with regard to conducting and flow via a hydraulic circuit in turn with a standardized hydraulic interface 32. At the hydraulic interface 32 on the tool side a hydraulic cylinder 34 is arranged, in which a piston can be acted upon, the piston rod of which acts on a core puller 36 for its operation. The hydraulic system on the injection moulding machine side has electrically controlled non-return valves 62, 63, which are connected with a container, in order to operate the hydraulic cylinder 34 in a pressureless manner according to the switching position, or to enable a corresponding pump operation. Electrically controlled non-return valves 61, 64 are provided, which make it possible to hold the piston in an end position without the servo drive having to apply the holding force when stationary, as this produces a high thermal load for the motor.

At least the following three operating states are run:

Extend cylinder: Pump conveys in the direction of the non-return valve 64, here the non-return valve 64 is open, the non-return valve 61 is open, the non-return valve 63 is open and the non-return valve 62 is closed.

Retract cylinder: Pump conveys in the direction of the non-return valve 61, here the non-return valve 61 is open, the non-return valve 64 is open, the non-return valve 63 is closed and the non-return valve 62 is open.

Operate cylinder in a pressureless manner: the pump is not operated, the non-return valves 61, 62, 63, 64 are open.

By suitable data of the pump, of the hydraulic load (piston unit) and of the angle information of the resolver and/or of an initialization procedure, in which the necessary data are determined, the piston can be positioned and can be moved over defined paths. The end position switches serve for monitoring the position of the core puller.

By additional use of path measurement and pressure measurement at the piston unit, the piston can be exactly positioned via a control unit in the controller and can travel exact paths (this is not represented in the drawings).

In addition in FIG. 1 a shaft interface 24 to a mechanical operating unit is illustrated, which arises here from a gear 50 and also a core puller 52 (now operated mechanically).

For the sake of completeness, in FIG. 1 also a standardized interface is illustrated for electric connections 54 and end position switches 56 arranged thereon. Via this interface, the switches and sensors can be connected with the controller 20 (not illustrated).

In the connection position shown in FIG. 1, by means of the servo motor 14 with interposition of the standardized shaft interface 24 the hydraulic pump 26 and again under interposition of the standardized hydraulic interface the hydraulic drive 34 for the core puller 36 can be operated in the moulding tool 12. Thereby, an auxiliary controller is realized for a hydraulic ancillary unit (here: core puller).

If the operator of an injection moulding machine now wishes to exchange the moulding tool and, in so doing, have recourse to a moulding tool which has no hydraulically actuated core pullers, but rather has mechanically actuated core pullers, then the servo motor 14 is released from the pump 26 via the shaft interface 24 and is flange-mounted onto the gear 50 by means of the identical shaft interface 24. This changeover is symbolized by the double arrow. Now with a correspondingly altered setting of the machine controller 20 via the input 22, the gear 50 and hence the core puller 52 can be operated by means of the same servo motor 14. Thereby, the universal auxiliary controller comprising the servo motor 14, the resolver 16, the converter 18, the machine controller 20 and the operating unit 22 ensures both the mode of operation of such mechanically driven ancillary units and also— possibly with interposition of a corresponding hydraulic operating element—the hydraulic operation of ancillary units.

This method can be used not only for tool ancillary units such as core pullers and ejectors, but also for the pressing of the injection unit, which can be carried out electrically or hydraulically.

Figure 2:
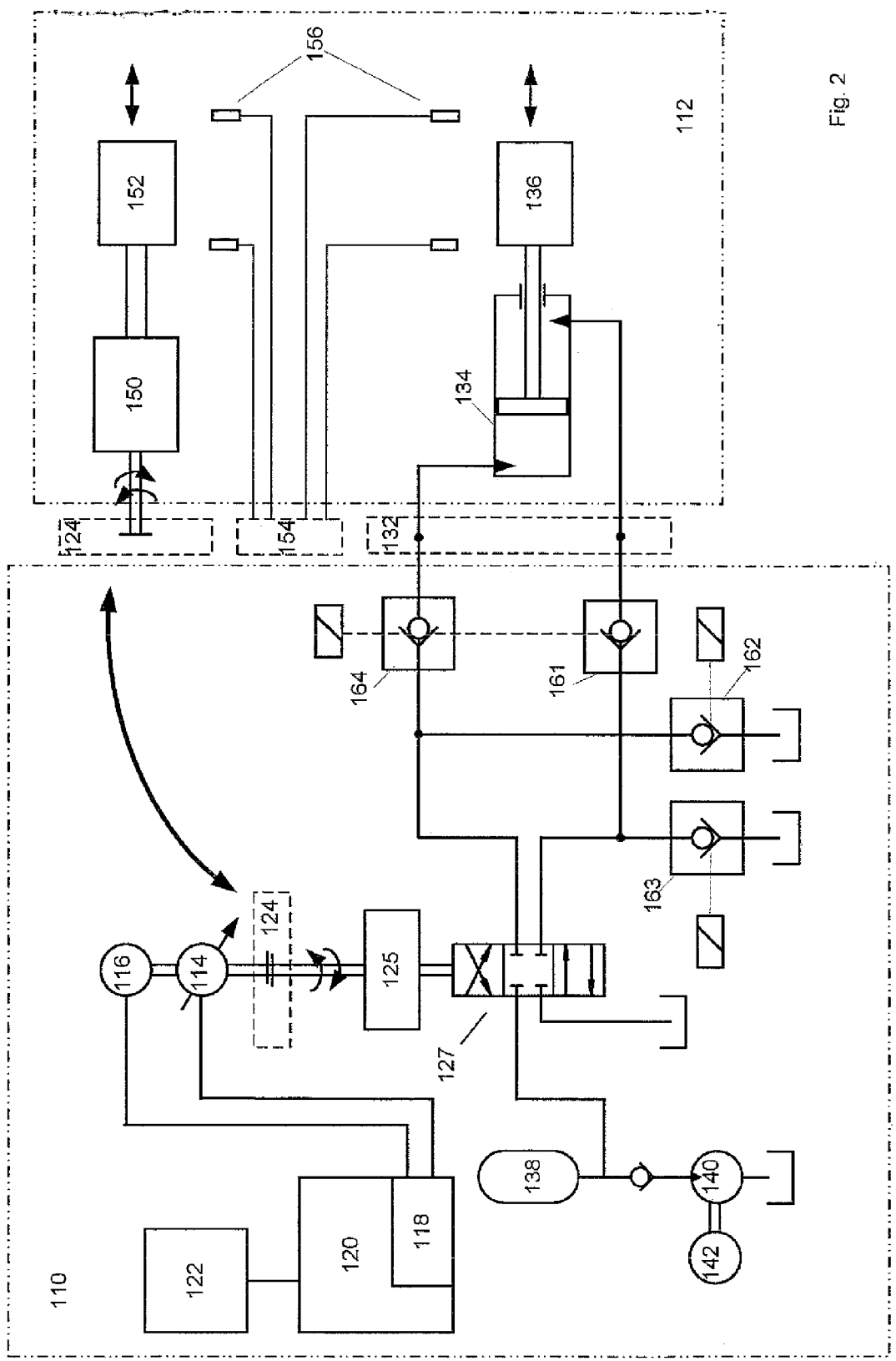

A further possibility of the embodiment according to the invention of a universal auxiliary controller is shown in FIG. 2, wherein the operation 122, the machine controller 120, the converter 118, the resolver 116 and the motor 114 correspond to the corresponding components in FIG. 1. Likewise, the standardized shaft interface 124, the gear 150 and the core puller 152 and also the standardized electric interface 154 and the end position switches 156 correspond to the components in FIG. 1. Furthermore, the hydraulic cylinder 134 and the core puller 146 correspond to the analogous elements in FIG. 1.

An alteration in this example embodiment according to FIG. 2 is that the servo motor 114 is coupled via the standardized shaft interface 124 with a gear 125, which is constructed for the mechanical operation of a slider of a valve 127. This arrangement forms a servo valve. The servo valve 127 is connected at the input side with a hydraulic supply and with a hydraulic container, and at the output side via corresponding hydraulic lines again with a standardized hydraulic interface 132. Electrically controlled non-return valves 162, 163 for the relieving of the hydraulic cylinder and electrically controlled non-return valves 261, 164 are again provided. Now the pressure in the hydraulic circuit is not—as in FIG. 1—acted upon via a hydraulic pump 26, but rather via a hydraulic circuit which is connected to the servo valve 127. This hydraulic circuit comprises a hydraulic accumulator 138 and at least one pump-motor combination 140, 142, wherein both with the motor 142 and also with the pump 140, this can be controllable or respectively adjustable units. The pressure which is provided by the hydraulic system is now provided to the hydraulic consumers (here: hydraulic cylinder 134 and core puller 136) via the servo valve 127, the subsequent hydraulic circuit and the hydraulic interface. The universal auxiliary controller can again be uncoupled from the shaft interface 124 of the hydraulic operating element and coupled onto the shaft interface of the mechanical operating system. Here also, according to the coupling with the universal auxiliary controller, the operation of both mechanical and also hydraulic operating elements is possible, wherein the different characteristics of the ancillary units must be known for the operation of the servo motor 114 and set in the controller 20.

The embodiment according to FIG. 2 offers the advantage of an excellent dynamics, with the disadvantage that the core puller can not be positioned in the tool without additional path measurement and the force limitation and the travel security requires additional pressure sensors (not illustrated in the drawings).

Figure 3:
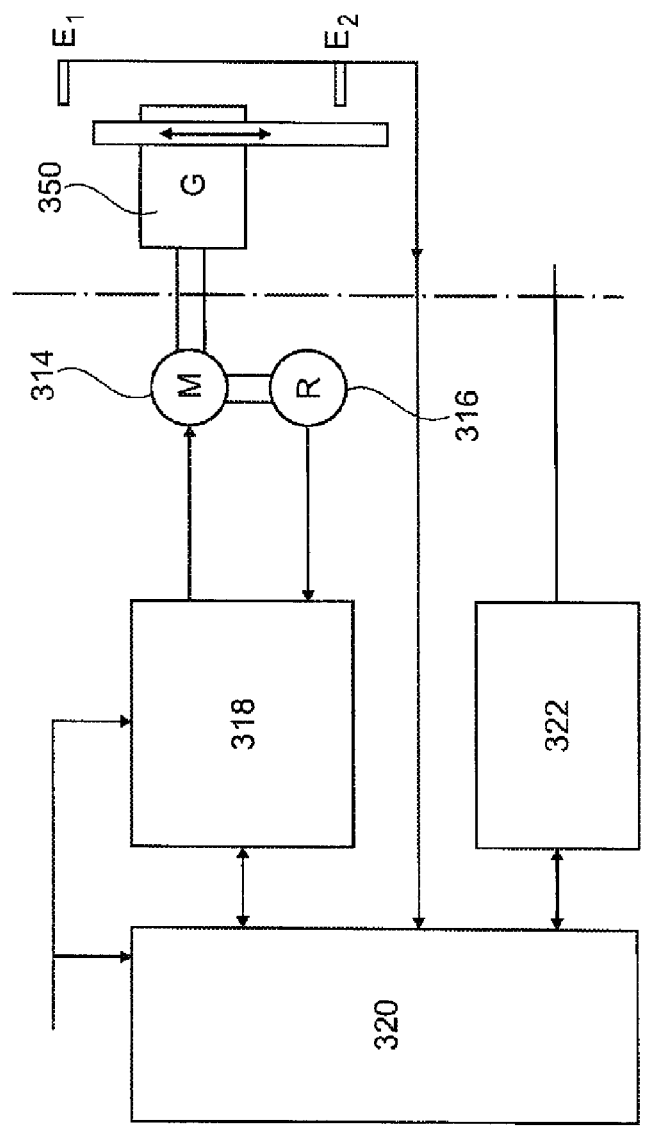

The same occurs as for the example embodiment in FIG. 1 for the example embodiment in FIG. 3, in which again a servo motor 314, a resolver 316, a converter 318, a machine controller 320 and an operating unit are provided, connected with one another accordingly. These elements correspond to the analogous elements in FIGS. 1 and 2 described further above.

Via the servo motor 314, with interposition of the standardized shaft interface, a gear 350 can be acted upon, which directly drives an element mechanically which is integrated, for example, in a tool. The signals of the end position switches $E_1$ and $E_2$ are fed back to the machine controller 322.

As a whole, electric and also hydraulic ancillary units can be operated in an energy-efficient manner or highly dynamically with the present invention. By the corresponding selection of the respective components, an operator can assemble in a modular manner or respectively build up progressively a system which is adapted to his requirements.

What is claimed is:

1. A universal auxiliary controller for an injection moulding machine, comprising:
    an operating unit;
    a machine controller coupled with the operating unit;
    a converter acted upon by the machine controller;
    a standardized shaft interface configured to complement a standardized shaft interface of a mechanical operating element of the injection moulding machine and a standardized shaft interface of a hydraulic operating element of the injection moulding machine, said standardized shaft interface being selectively connectable to the complementary standardized shaft interface of the mechanical operating element and to the complementary standardized shaft interface of the hydraulic operating element;
    a controllable electric motor acted upon by the converter and connected with the standardized shaft interface; and
    a resolver providing information about operation and position of the electric motor to the machine controller.

2. The universal auxiliary controller of claim 1, wherein the mechanical operating element comprises a gear which is connected with the complementary shaft interface.

3. The universal auxiliary controller of claim 1, wherein the mechanical operating element is integrated into a moulding tool for an injection moulding machine.

4. The universal auxiliary controller of claim 1, wherein the hydraulic operating element has a standardized hydraulic interface which is connectable with a complementary hydraulic interface of a hydraulic drive.

5. The universal auxiliary controller of claim 4, wherein the hydraulic operating element has a hydraulic pump directly or indirectly connected mechanically with the complementary shaft interface and fluidly connected with the hydraulic interface.

6. The universal auxiliary controller of claim 5, further comprising a gear provided between the complementary shaft interface and the hydraulic pump.

7. The universal auxiliary controller of claim 4, further comprising a servo valve having a slider which is actuatable indirectly or directly via the shaft interface with the electric motor, said servo valve being fluidly connected at an output side with the hydraulic interface and at an input side with a hydraulic supply.

8. The universal auxiliary controller of claim 7, wherein the hydraulic supply comprises a hydraulic accumulator and a pump-motor combination.

9. The universal auxiliary controller of claim 7, further comprising a gear connected between the complementary shaft interface and the servo valve.

10. The universal auxiliary controller of claim 1, further comprising an arrangement to carry out calibration processes for determination of stroke, travel resistance course and/or of the transmission ratio from an electric motor angle position up to a position of an auxiliary drive in a moulding tool.

11. The universal auxiliary controller of claim 1, further comprising an arrangement to carry out initialization processes for the preparation of coupling and/or uncoupling of the shaft interface to ensure a suitable position of a shaft of the electric motor.

12. The universal auxiliary controller of claim 1, further comprising an arrangement to carry out checking processes for checking a coupling of the shaft interface by checking whether the coupling transfers a necessary torque and whether a correct interface was coupled.

13. The universal auxiliary controller of claim 1, further comprising a detection arrangement to reach a predetermined position without path measurement in a moulding tool.

14. The universal auxiliary controller of claim 1, further comprising an arrangement for detecting a travel resistance using a motor current during travel movement, and comparing the travel resistance with deposited threshold values, threshold value courses or stored good values.

* * * * *

UNITED STATES PATENT AND TRADEMARK OFFICE
CERTIFICATE OF CORRECTION

PATENT NO. : 8,568,123 B2  Page 1 of 1
APPLICATION NO. : 13/823576
DATED : October 29, 2013
INVENTOR(S) : Friedrich Werfeli It is certified that error appears in the above-identified patent and that said Letters Patent is hereby corrected as shown below:

Title Page Item (73), Assignee:
Change assignee's country of business from "(DE)" to -- (CH) --.

Signed and Sealed this
Thirty-first Day of December, 2013

Margaret A. Focarino
*Commissioner for Patents of the United States Patent and Trademark Office*